L. W. COPPOCK.
AUTOMOBILE.
APPLICATION FILED JUNE 8, 1911.

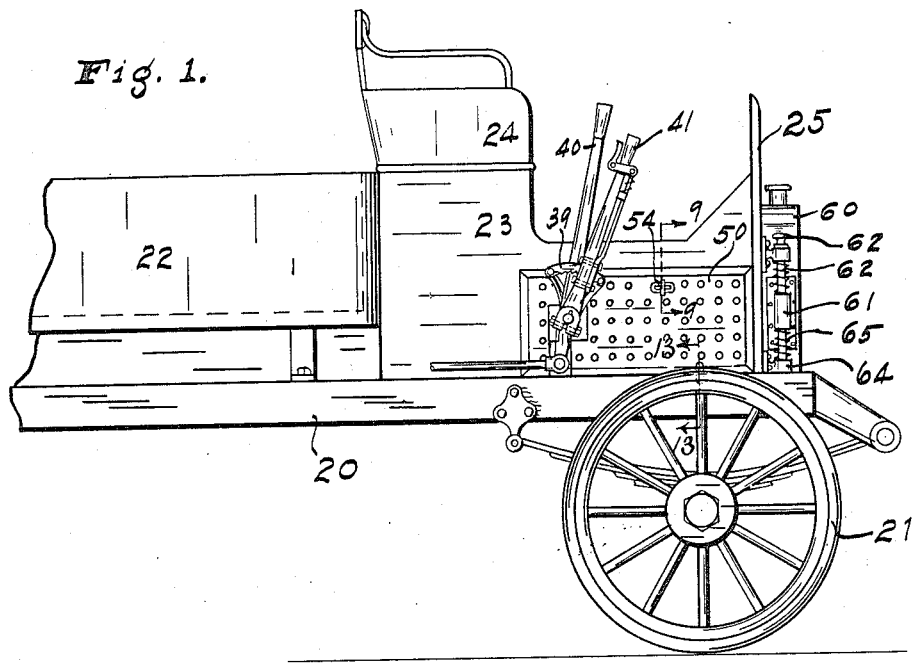
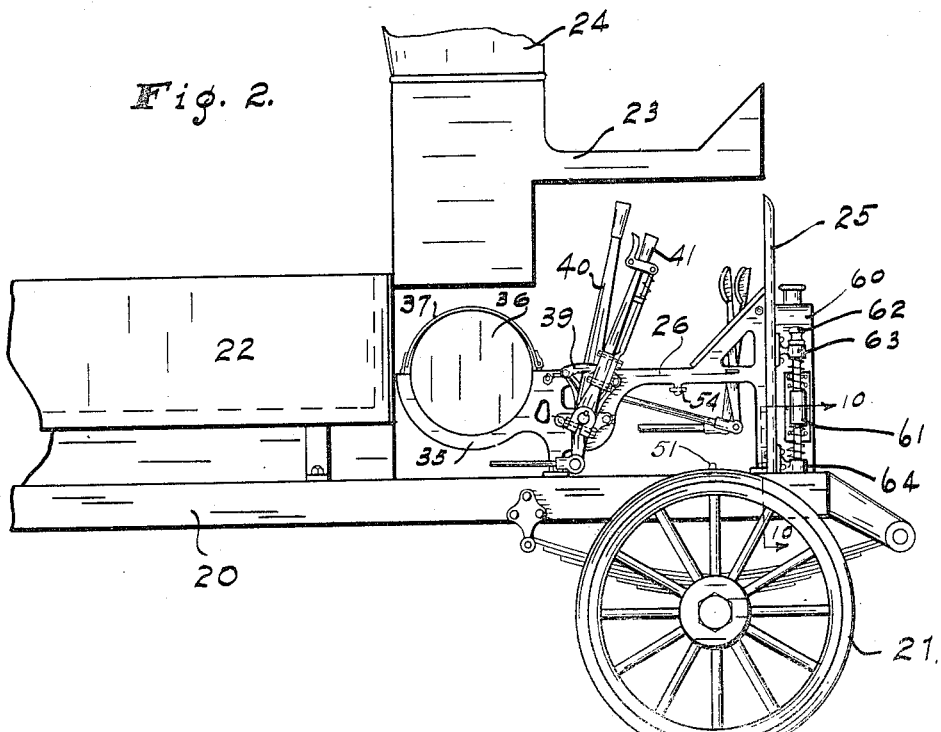

1,075,816.

Patented Oct. 14, 1913.
3 SHEETS—SHEET 2.

WITNESSES:
W. M. Gentle.
O. M. McLaughlin.

INVENTOR.
Lembert W. Coppock.
BY
V. H. Lockwood.
ATTORNEY.

L. W. COPPOCK.
AUTOMOBILE.
APPLICATION FILED JUNE 8, 1911.

1,075,816.

Patented Oct. 14, 1913.
3 SHEETS—SHEET 3.

WITNESSES:
W. M. Gentle.
D. M. McLaughlin

INVENTOR.
Lembert W. Coppock.
BY
V. H. Lockwood
ATTORNEY.

UNITED STATES PATENT OFFICE.

LEMBERT W. COPPOCK, OF DECATUR, INDIANA.

AUTOMOBILE.

1,075,816.

Specification of Letters Patent.  Patented Oct. 14, 1913.

Application filed June 8, 1911. Serial No. 631,894.

*To all whom it may concern:*

Be it known that I, LEMBERT W. COPPOCK, of Decatur, county of Adams, and State of Indiana, have invented a certain useful Automobile; and I do hereby declare that the following is a full, clear, and exact description thereof, reference being had to the accompanying drawings.

The object of this invention is to improve the construction of motor trucks so as to render the same more easily assembled and disassembled and render the parts thereof more accessible and at the same time make the construction more durable.

The nature of the invention will be understood from the accompanying drawings and the following description and claims.

Figure 3:
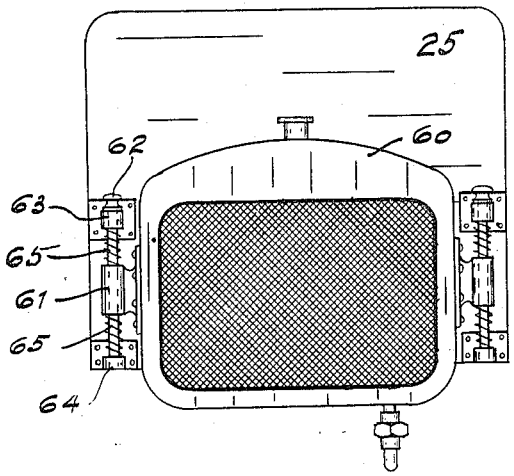
Figure 4:
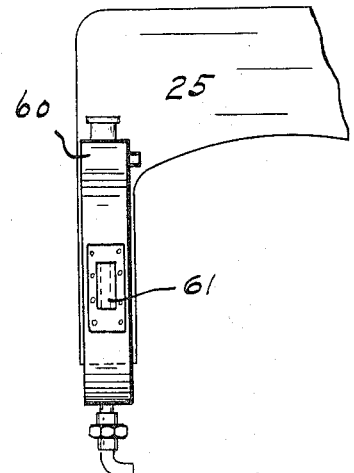
Figure 5:
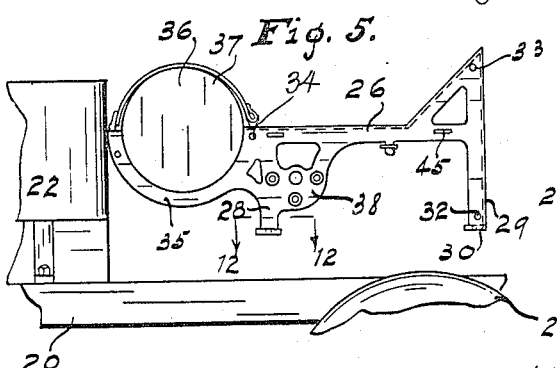
Figure 6:
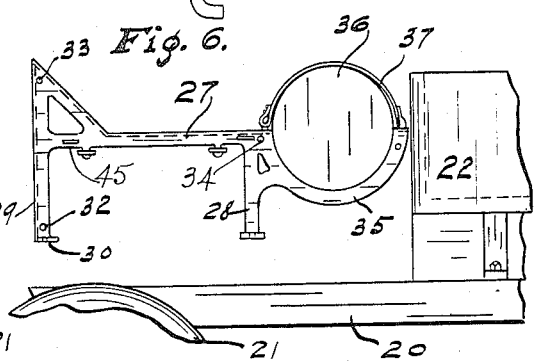
Figure 7:
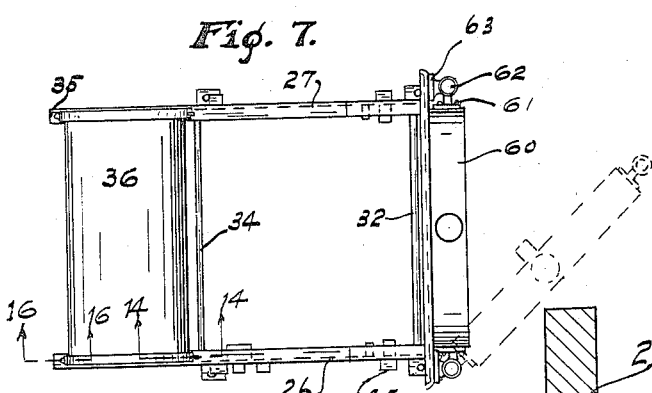
Figure 8:
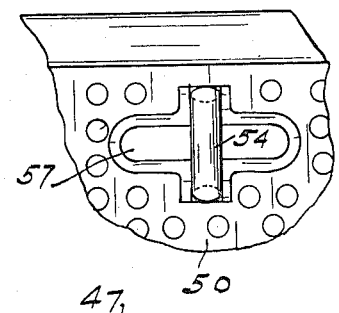
Figure 9:
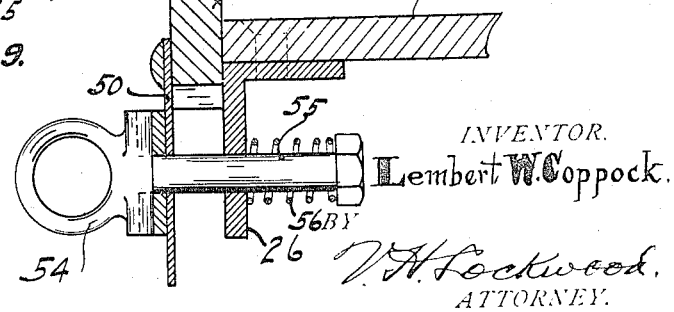
Figure 10:
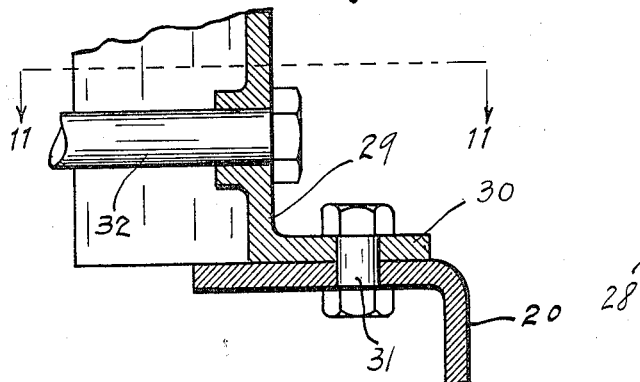
Figure 12:
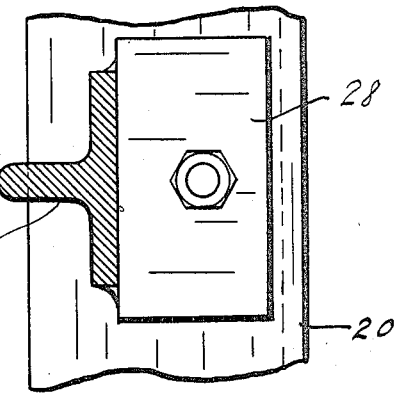
Figure 11:
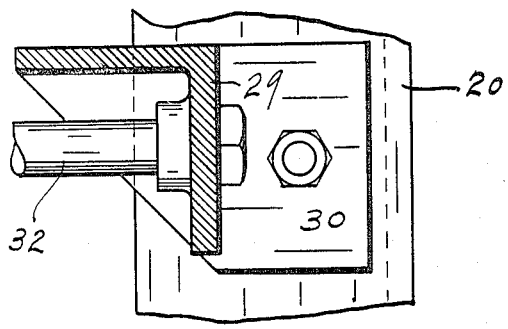
Figure 13:
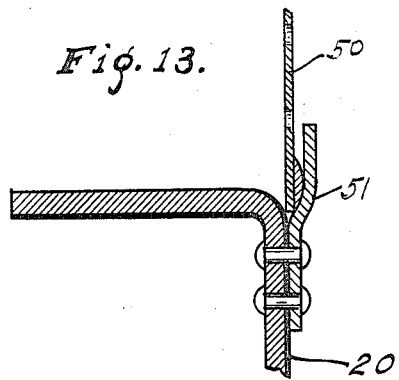
Figure 14:
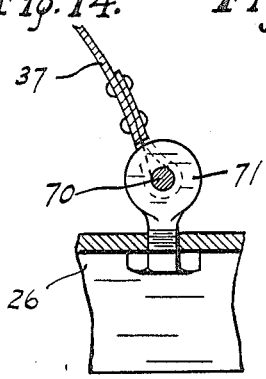
Figure 15:
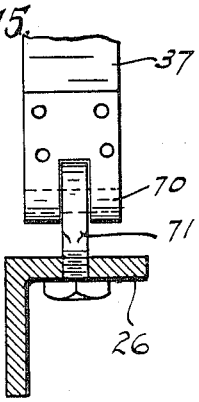
Figure 16:
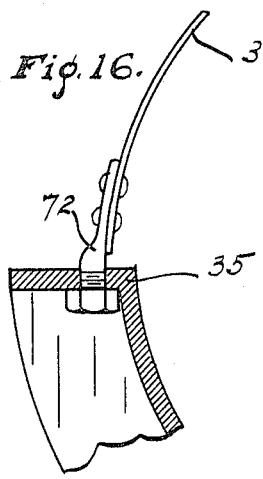

In the drawings, Figure 1 is a side elevation of the forward portion of said motor truck. Fig. 2 is the same showing the seat and front body portion in an elevated position. Fig. 3 is a front elevation of the dashboard and water cooler. Fig. 4 is the same as the left-hand part of Fig. 3 with the water cooling device turned on its hinges to an open position. Fig. 5 is a part of the automobile frame and rear part of the body and upper part of one front wheel and a part of the frame carrying the mechanism, said frame being, however, elevated. Fig. 6 is a similar view of the left-hand side of the machine. Fig. 7 is a plan view of the forward portion of the vehicle omitting the seat, body, wheels and machinery, and the water-cooling apparatus being shown in an open position by dotted lines. Fig. 8 is a side elevation of a part of the air inlet plate at the side of the construction on an enlarged scale, the remainder thereof being broken away. Fig. 9 is a section on the line 9—9 of Fig. 1 through a part of the machine. Fig. 10 is a vertical section on the line 10—10 of Fig. 2, but showing the same on a large scale. Fig. 11 is a section on the line 11—11 of Fig. 10. Fig. 12 is a section on the line 12—12 of Fig. 5. Fig. 13 is a section on the line 13—13 of Fig. 1. Figs. 14, 15 and 16 show the means by which the gasolene tank is held in place.

In detail, the drawings herein presented for the purpose of illustrating the general nature of the invention include a chassis frame 20 mounted on suitable wheels 21 and having a main body portion 22 and a front body portion 23 carrying the seat 24 and which extends from the main portion 22 to the dash 25. The front body portion 23 is readily separable from the automobile, as illustrated in Fig. 2, for the purpose of rendering the machinery accessible. The engine and associated parts are mounted at the front part of the automobile under said body portion 23.

At the right-hand side of the automobile there is a metal frame 26, shown best in Fig. 5, and at the left-hand side there is a somewhat similar metal frame 27, and these frames are for the purpose of supporting the body portion 23. Each frame has legs 28 and 29 with horizontal feet 30 at their lower ends secured on the chassis frame 20, as shown in Figs. 10 and 11, by bolts 31, whereby said frames 26 and 27 are readily removable from the chassis frame. They are held in place with relation to each other by transverse rods 32, 33 and 34, see Figs. 5 and 7. The rod 32 connects the lower forward portions of said frames 26 and 27, and the rod 33 connects the upper front portion thereof, whereas the rod 34 connects the rearward portions of said frames, and to the rear of said rod 34 said frames are provided with semi-circular portions or arms 35 for supporting the gasolene tank 36, which is held in place by straps 37. The front end of the straps has an eye containing a pin 70, which extends through the eye-bolt 71, which extends down through the horizontal flange at the upper part of either of the frames 26 or 27, as appears in Figs. 14 and 15. The straps 37 at the rear end are riveted to a screw bolt 72, which extends through the horizontal portion at the rear end of the frames 26 or 27. The frame 26 is provided with a portion marked 38 for the mounting of the segment 39 and levers 40 and 41 for controlling the machine.

Each frame 26 and 27 is provided near its front end with an outwardly extending frame 45 upon which the forward part of the body portion 23 is adapted to be placed and supported, while the rear lower part of the body 23 rests upon the chassis frame, and the two sides of the body frame 23 are connected by a suitable floor 47, see Fig. 9, and the seat 24. Hence, the parts 23, 24 and 47 constitute practically one portion of the body and can be vertically lifted off the structure, which has been described. It is held in place by the chassis frame and frames 26 and 27 and the body portion 22 and dash 25

An air inlet plate 50 is located at each side of the forward portion of the automobile, as shown in Fig. 1, and just outside of the plates 26 and 27. It is a perforated metal plate, see Fig. 8, and its lower edge is supported in place, as shown in Fig. 13, by upwardly extending fingers 51 secured to the chassis frame. The upper portion of said air inlet plate is held in place by the head 54 of the bolts 55, see Fig. 9, which extends through said plate and also through part of the frame 26, and the plate 50 is held tightly in place by reason of the spring 56 around the bolt 55 pressing against a nut on the inner end of the bolt and against the frame 26. The plate 50 on each side of the machine is similarly mounted and it renders the same readily removable in order to gain access to the mechanism inside of the machine and under the floor 47. The bolt 55 extends through a slot 57, as shown in Fig. 8, so that when the head 54 is turned horizontally the plate 50 can be slipped off the head 54.

The cooling device 60 is mounted in connection with the dash, as indicated in Figs. 3 and 4. There is secured at each lateral side of the cooling device a sleeve 61, which sets over a removable bolt 62, which extends through an eye 63 above and into a socket 64 below, so that said bolt 62 is readily removable by lifting it upward like the bolt in a door hinge. There is a spring 65 around said bolt 62 on each side of the sleeve 61. The construction on both sides is alike so that either bolt 62 may be lifted and the cooling device swung in either direction, as desired, out of the way to render the engine and other mechanism accessible.

The dash 25 is somewhat like an inverted U. The upper portion is plane and to the downwardly laterally extending portions, corresponding to the legs of the U, the eyes 63 and the sockets 64 are secured.

I claim as my invention:

1. An automobile including a chassis frame, a skeleton frame at each side of the automobile extending upwardly from said chassis frame and between which the engine and associated parts are adapted to be mounted, and a body portion including side walls, a seat, and a floor in front of the seat, a portion of the side walls resting upon said chassis frame and another portion of the side wall resting upon said skeleton frames so that said body portion is readily removable.

2. An automobile including a chassis frame, a rear body portion, and a dash spaced apart and secured to the chassis frame, a vertically disposed skeleton frame secured at each side of the automobile and between the dash and rear body portion and secured upon the chassis frame and between which the engine and associated parts are adapted to be mounted, and a forward body portion including sides, a seat and a floor removably mounted upon said chassis frame and skeleton frames and between the dash and rear body portion, so that it is adapted to be lifted out of place when desired.

3. An automobile including a chassis frame, a skeleton frame at each side of the automobile extending upwardly from said chassis frame between which the engine and associated parts are adapted to be mounted, a dash in front of said skeleton frames, a forward body portion having the forward part thereof mounted upon said skeleton frames and the rear portion overlapping said skeleton frames and resting upon the chassis frame, and an air inlet plate removably secured at each side of the automobile in connection with the chassis frame and said skeleton frames.

4. An automobile including a chassis frame, adapted for the engine and associated parts to be mounted on the front portion thereof, a dash mounted in connection with said frame in front of the position for said engine and associated parts and consisting of an upper portion and lateral downwardly extending portions so the engine and associated parts will be accessible from the front through said dash, and a water cooler adapted to close the opening through the dash to the engine and having at each end a vertical sleeve, removable bolts extending through said sleeve and carried by said dash, and a spring on said bolts on each side of each sleeve, whereby when one bolt is withdrawn the water cooler can be swung laterally out of the way to render the machinery accessible.

In witness whereof, I have hereunto affixed my signature in the presence of the witnesses herein named.

LEMBERT W. COPPOCK.

Witnesses:
 A. H. BARNARD,
 K. A. MYERS.